United States Patent [19]

Borup et al.

[11] Patent Number: 5,097,532
[45] Date of Patent: Mar. 17, 1992

[54] CIRCUIT FOR ENABLING A CACHE USING A FLUSH INPUT TO CIRCUMVENT A LATE NONCACHABLE ADDRESS INPUT

[75] Inventors: Craig A. Borup, Spring; Joseph P. Miller, Houston, both of Tex.

[73] Assignee: Compaq Computer Corporation, Houston, Tex.

[21] Appl. No.: 369,454

[22] Filed: Jun. 20, 1989

Related U.S. Application Data

[63] Continuation-in-part of Ser. No. 318,919, Mar. 3, 1989.

[51] Int. Cl.⁵ .................. G06F 12/06; G06F 9/312; G06F 1/12
[52] U.S. Cl. ..................... 395/425; 364/243.41; 364/266.3; 364/270; 364/271.4; 364/964.2; 364/957.1; 364/254.2; 364/254.3; 364/957.5; 364/960.2; 364/251.1; 364/251.3; 364/960.6; 364/DIG. 1
[58] Field of Search ... 364/200 MS File, 900 MS File

[56] References Cited

U.S. PATENT DOCUMENTS

| | | |
|---|---|---|
| 4,426,682 | 1/1984 | Riffe et al. ............... 364/200 |
| 4,622,631 | 11/1986 | Frank et al. ............... 364/200 |
| 4,713,755 | 12/1987 | Worley, Jr. et al. ............... 364/200 |
| 4,755,930 | 7/1988 | Wilson, Jr. et al. ............... 364/200 |
| 4,775,955 | 10/1988 | Liu ............... 364/900 |
| 4,802,120 | 1/1989 | McCoy ............... 364/900 |
| 4,827,401 | 5/1989 | Hrustich et al. ............... 364/200 |
| 4,833,601 | 5/1989 | Barlow et al. ............... 364/200 |

OTHER PUBLICATIONS

Intel Corporation, Intel 1990 Microprocessor and Peripheral Handbook, pp. 4-343-4-409: 1990.

Primary Examiner—Thomas C. Lee
Assistant Examiner—Ken S. Kim
Attorney, Agent, or Firm—Pravel, Gambrell, Hewitt, Kimball & Krieger

[57] ABSTRACT

A circuit for generating a synchronized flush signal for use with a cache controller which samples the noncachable address input too late for that input to be used to disable the cache controller is described. The circuit synchronizes a memory-mapped register bit with the internal clock signal in the cache controller to insure setup and hold times and proper phasing. The use of the synchronized flush signal overcomes coherency problems with the noncachable input.

7 Claims, 2 Drawing Sheets

CIRCUIT FOR ENABLING A CACHE USING A FLUSH INPUT TO CIRCUMVENT A LATE NONCACHABLE ADDRESS INPUT

This application is a continuation-in-part of copending application Ser. No. 318,919, filed Mar. 3, 1989.

BACKGROUND OF THE INVENTION

1. Field of the Invention

The invention relates to computer systems, and more particularly to computer systems having cache memory systems.

2. Description of the Related Art

Personal computer systems are becoming quite advanced and are approaching the capabilities of mainframe and minicomputers of a few years ago. Personal computers compatible with those developed by International Business Machines Corporation (IBM) utilize microprocessors and related parts developed by Intel Corporation (Intel). These microprocessors include the 8088, the 8086, the 80286, and most recently the 80386. Each of these devices has had a greater performance than its predecessor, because of increasing clock speeds, increasing word sizes, increasing memory size and many other factors.

The speeds available for the 80386, the 32 bit processor, are such that cost effective memory devices limit the performance of the personal computer. The memory devices are relatively slow so that wait states must be added to memory accesses so that the data is properly read or written. Thus the processor can not run at full speed. Memory devices which would allow the processor to run at full speed are available, but are cost prohibitive in most cases. To resolve this problem Intel developed the 82385, a cache memory controller for use with the 80386. A cache memory is a small area of very fast memory from which the processor can run at full speed. Only a small amount of this memory is used for cost reasons, so the cache controller has the duty of controlling accesses to the main memory or the cache memory. When the data is present in the cache memory the controller uses the cache, while if the data is present only in main memory, the data is retrieved from the main memory, provided to the processor and stored in the cache for later use. By proper sizing of the cache memory and the cache algorithm, hit rates, that is, references to the cache memory only, may reach into the area of 90% or greater. The 82385 is such a controller. Details of the operation of the 80386 and the 82385 are available in various books published by Intel, such as the Microprocessor and Peripheral Handbook, Volume 1, Microprocessor, 1988, and by other parties. Familiarity with the 80386 and 82385 will be presumed in this specification.

There are two signals of interest relating to the 82385 in this description. The first signal is the NCA* or noncachable address signal. This signal is an input to the 82385 and is used to indicate that the address being presented by the 80386 is noncachable, that is, a copy of the data should not be stored in the cache memory. This occurs for several reasons, one being that the location is not a read/write location as in the case of a mapped peripheral register. When this signal is lowered at the appropriate time, the 82385 understands that the address is noncachable and always passes the cycle on to the main memory, without referencing the various tables in the 82385. This signal thus was originally suitable to be used as a signal to disable the functioning of the cache memory system. The NCA* signal was held low and all operations were passed through to the main memory. This technique worked satisfactorily for the earlier 16 MHz and 20 MHz versions of the 82385. However, in certain 25 MHz, all faster and certain other newer versions of the 82385 the timing of the signal was changed. The internal sampling time of the signal was delayed for other reasons.

A possible cache coherency problem developed. The cache is not coherent if different data values can exist at a memory location and the copy of that location in the cache memory. If the NCA* signal was utilized in the previous manner, a coherency problem could develop as follows. The cache system would be enabled and a particular memory location would be read. This loads the data value into the cache memory. The cache system would then be turned off, by driving the NCA* signal low for all cycles. A write operation would then be performed to the particular memory location. The data would be properly stored in the main memory, but would not be stored in the cache memory because the timing change did not leave sufficient time for the cache controller to update the cache memory. The cache system would then be turned on by releasing the NCA* signal. Thus the data would be different in the two locations but the internal valid flag bit in the 82385 would still be set. Thus a coherency problem could exist.

The other signal of interest is the FLUSH signal, which is used to flush the entire cache memory. This is simply done by the 82385 by clearing all the valid bits. The specifications for the 82385 indicate that the FLUSH input must be held high for 4 CLK cycles to insure that all the valid bits have been cleared. If the FLUSH input is high past the 4 cycles, any accesses to the cache will be considered misses and transferred to the main memory and the cache will not be updated. Intel notes that the use of the FLUSH input as a coherency mechanism may impact software transparency.

SUMMARY OF THE INVENTION

A computer system according to the present invention uses the FLUSH input on the 82385 to enable and disable the cache to insure coherency. A bit in a memory space register is defined as the CACHEON bit. The processor writes the appropriate value to this bit to enable or disable the cache controller. A value of one to this location enables the cache. The output of the register is synchronized to the internal CLK signal of the 82385 so that the signal is of the appropriate phase and timing for use by the 82385. The synchronized signal is then connected to the FLUSH input on the 82385. The processor can then enable or disable the cache memory system under software control without coherency problems. There are no coherency problems because the cache is effectively empty when reenabled.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
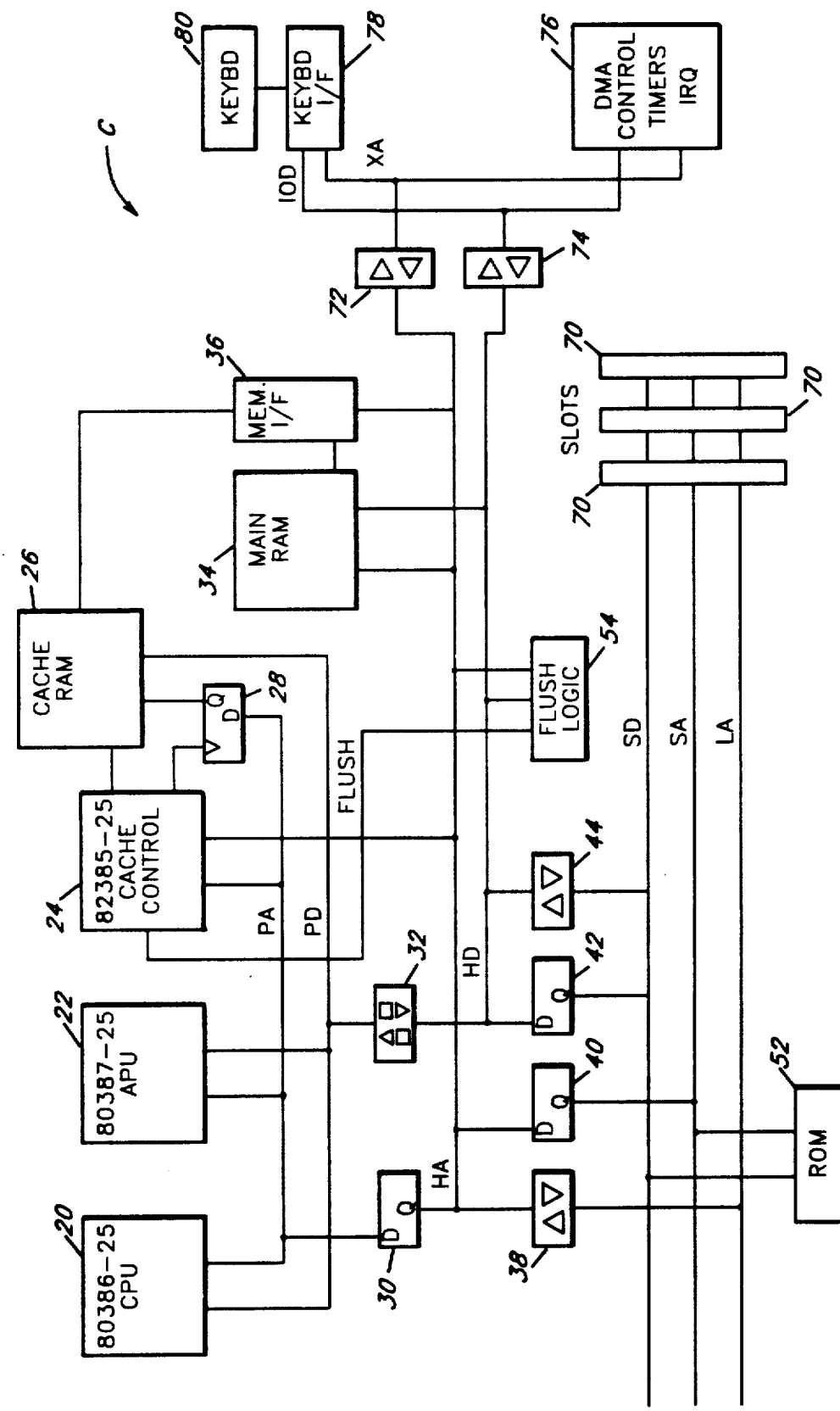
FIG. 1 is a block diagram of a computer incorporating the present invention.

Referring now to FIG. 1, the letter C generally represents a computer incorporating the present invention. A number of different blocks are used in the computer C. The microprocessor 20 used is preferably an 80386-25 microprocessor manufactured by Intel. The microprocessor 20 has an address bus PA and a data bus PD, these buses PA and PD being referred to as the local buses. Coupled to the local bus are an arithmetic processing unit or numeric coprocessor 22, preferably an 80387-25 manufactured by Intel; a cache controller 24, preferably an 82385-25 manufactured by Intel; cache RAM 26 and an address latch 28. The cache controller 24 cooperates with the cache RAM 26 to provide the necessary control to handle a cache system in the computer C. The local bus is connected to an intermediate bus by means of a latch 30 which connects the local address bus PA to an intermediate address bus HA. A latched transceiver 32 connects the local data bus PD to an intermediate data bus HD. Connected to the intermediate bus is the main memory 34 in the computer C and a memory interface 36. The memory 34 is thus relatively tightly coupled to the processor 20.

Also coupled to the intermediate bus is flush logic 54. The flush logic 54 is connected to the intermediate address bus HA and the intermediate data bus HD. The flush logic 54 produces a FLUSH output signal which is connected to the FLUSH input of the cache controller 24.

Various other buses are developed from the intermediate bus. For example, intermediate address bus HA is coupled by a transceiver 38 to an early system address bus LA and by a latch 40 to a latched system address bus SA. The intermediate data bus HD is coupled by a latch 42 and a transceiver 44 to the system data bus SD. A series of slots 70 which are used for receiving interchangeable circuit boards which contain additional functions which can be utilized in the computer C are coupled to the system buses LA, SA and SD. The read only memory (ROM) 52 which contains the basic operating software of the computer C is connected to the system data bus SD and the latched system address bus SA.

Various other subsystems are coupled to the intermediate data and address buses HD and HA. A transceiver 72 is connected to the intermediate address bus HA and to an extended address bus XA. A transceiver 74 is connected between the intermediate data bus HD and an input/output (I/O) data bus IOD. Connected to the extended address bus XA and the I/O data bus IOD is a combined unit 76 which contains the DMA controller for the computer C, a series of timers and the interrupt controller. A keyboard interface 78 is also connected to the extended address bus XA and the I/O data bus IOD. A keyboard 80 is connected to the keyboard interface 78 to allow the user to enter desired character sequences and commands.

Figure 2:
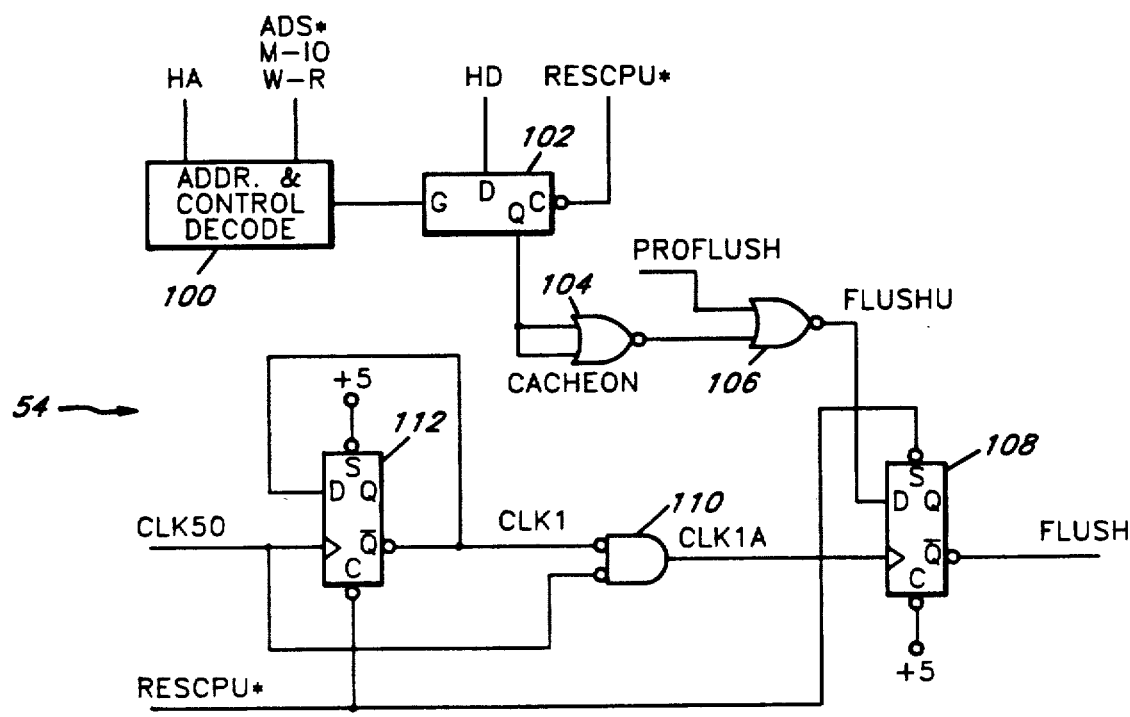
FIG. 2 is a schematic circuitry diagram of portions of FIG. 1.

The FLUSH logic 54 is shown in more detail in FIG. 2. Address and control decode logic 100 is connected to the intermediate address bus HA and receives appropriate control signals such as M-IO, W-R and ADS* from the 82385. The address and control decode logic 100 uses the various signals to determine when a write request is made to a particular memory location assigned to cache enable operations. When this write request is present a signal is provided to the register 102 which contains the CACHEON bit. The timing of the signal from the address and control decode logic 100 is such that the data present on the intermediate data bus HD is latched into the register 102 when the data is valid. The register 102 is cleared by a signal referred to as RESCPU*, which is low when the processor 20 is being reset. This is the basic reset signal for the computer C. Thus at power up the CACHEON bit is low, disabling the operation of the cache until after the power on self test portion of the software begins diagnostic operations on the cache system.

The CACHEON signal is provided to the two inputs of a two input NOR gate 104. The output of the NOR gate 104 is connected to one input of a two input NOR gate 106. The second input is the PROFLUSH signal. The PROFLUSH signal is a signal produced by other circuitry in the computer C and indicates that the processor 20 has just shifted from protected to real mode, a write operation has been attempted to the ROM 52 address space or certain other conditions. These are conditions where cache coherency is a problem and so the NOR gate 106 combines the two signals. The FLUSHU signal output by the NOR gate 106 is provided to the D input of a D-type flip-flop 108. This is the FLUSH flip-flop. The inverting output of the FLUSH flip-flop 108 is the FLUSH signal and is connected to the FLUSH input of the cache controller 24. The set input of the FLUSH flip-flop 108 is connected to the RESCPU* signal.

The clock input of the FLUSH flip-flop 108 is provided by the output of a two input NOR gate 110. The two inputs to the NOR gate 110 are the CLK1 signal and the CLK50 signal. The CLK50 signal is the 50 MHz clock signal utilized in a 25 MHz 80386-based computer system to develop the various system clocks. The CLK1 signal is the inverted output of a synchronizing D-type flip-flop 112. The synchronizing flip-flop 112 has the CLK50 signal connected to the clocking input and the CLK1 signal connected to the D input, so that the flip-flop 112 is configured in a toggle configuration. The RESCPU* signal is connected to clear input of the synchronizing flip-flop 112. These connections of the RESCPU* signal are used to insure that output of the NOR gate 110 is of the proper timing and phase. The CLK1 signal is in phase with the CLK signal developed internally in the cache controller 24 because the RESCPU* signal releases both the cache controller 24 and the synchronizing flip-flop 112 at the same time. The further inclusion of the CLK50 signal in the NOR gate 110 provides the remaining clock timing for synchronizing the FLUSH signal to appear properly phased with respect to the cache controller 24 internal CLK signal and to have proper setup and hold times.

Figure 3:
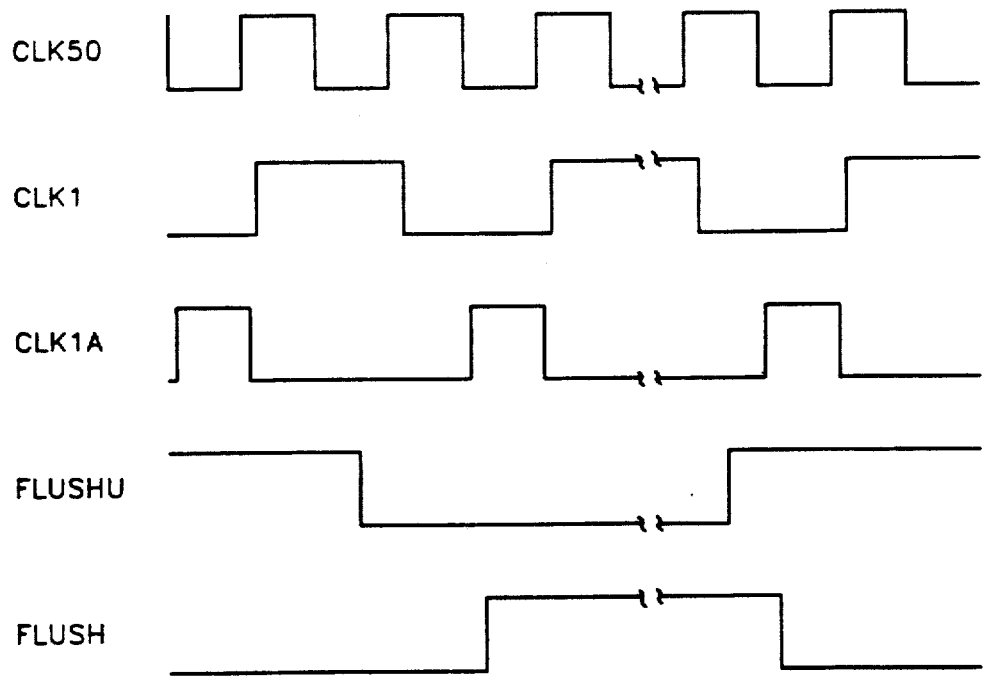
FIG. 3 is a timing diagram of the circuitry of FIG. 2.

Exemplary timing is shown in FIG. 3. The CLK50 signal is an approximately 50% duty square wave with a 50 MHz frequency. The CLK1 signal is 50% duty cycle square at one-half the frequency or 25 MHz. The CLK1A signal, the output of the NOR gate 110 then is high when both the CLK50 and the CLK1 signals are low. The CLK1A signal thus has appropriate phasing for use by the cache controller 24. The low FLUSHU signal arrives relatively asynchronously from the register 102 via the NOR gates 104 and 106. The synchronized high FLUSH signal is developed on the next the rising edge of the CLK1A signal. The FLUSH signal stays at this level until the FLUSHU signal goes high based on the processor 20 writing a one value to the CACHEON bit in the register 102. The FLUSH signal goes low on the next rising edge of the CLK1A signal, reenabling the cache controller 24, which then proceeds to fill the cache memory with valid data.

As previously noted the FLUSH signal must be held high for at least four internal CLK cycles on the 82385. This is done in the preferred embodiment because it takes greater than four internal CLK cycles to perform an instruction on the 80386, so the register 102 cannot be written twice fast enough for this condition not to be met. Thus the coherency of the cache is assured for this technique of disabling the cache because effectively there will be no data in the cache when the cache is enabled. Therefore two different copies of the data will not exist in the main memory and the cache memory.

The foregoing disclosure and description of the invention are illustrative and explanatory thereof, and various changes in the size, shape, materials, components, circuitry, wiring connections and contacts, as well as in the details of the illustrated circuitry and construction and method of operation may be made without departing from the spirit of the invention.

We claim:

1. A computer system, comprising:
 a processor having address and data lines;
 cache memory coupled to said address and data lines;
 a cache controller coupled to said processor and to said cache memory including a means for developing an internal clock signal and having a noncachable address input which is sampled too late, allowing operations that access memory address space designated as noncachable to be performed by said cache memory, and a flush input which clears the validity status of said cache memory;
 a register coupled to said processor for storing a desired enabled state of said cache controller and providing a signal indicative thereof; and
 means for synchronizing said desired enabled state signal to said internal clock signal of said cache controller, said synchronized desired enabled signal being connected to said cache controller flush input to clear the validity status of said cache memory so that operations that access memory address space designated as noncachable are not performed by said cache memory.

2. The computer system of claim 1, wherein said means for synchronizing includes means for generating a clock signal in synchronization and phase with said internal clock signal in said cache controller.

3. The computer system of claim 2, wherein said means for synchronizing further includes means for using said synchronized clock signal to synchronize said desired enabled state signal.

4. The computer system of claim 3, wherein said means for using includes a first flip-flop having said desired enable signal coupled to a data input, said synchronized clock signal to the clocking input and the output connected to said cache controller flush input.

5. The computer system of claim 4, further comprising:
 a system clock signal for connection to said cache controller, and
 wherein said means for generating a synchronized clock signal includes a second flip-flop having said system clock signal connected to the clock input, said second flip-flop configured for toggle operation.

6. The computer system of claim 5, wherein said means for generating a synchronized clock signal further includes a NOR gate whose inputs are said system clock signal and the output signal of said second flip-flop and whose output is said synchronized clock signal.

7. The computer system of claim 6, further comprising:
 a reset signal coupled to said processor, to said cache controller, to said register and to said means for synchronizing, and
 wherein said reset signal is connected to the clear input of said second flip-flop and to the set input of said first flip-flop.

* * * * *